(No Model.) 2 Sheets—Sheet 2.
V. A. KEMPER.
AUTOMATIC VEHICLE BRAKE.
No. 533,649. Patented Feb. 5, 1895.
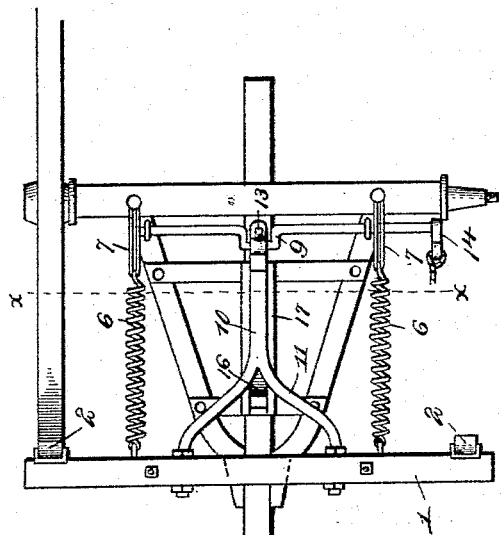
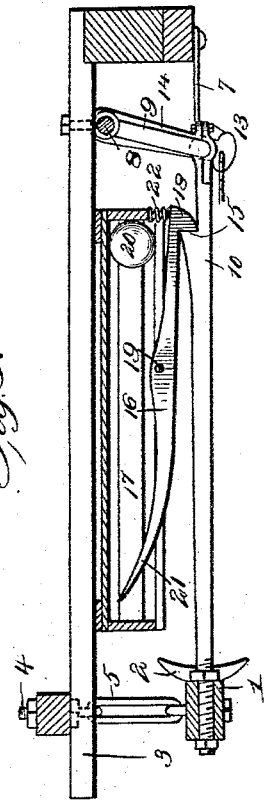
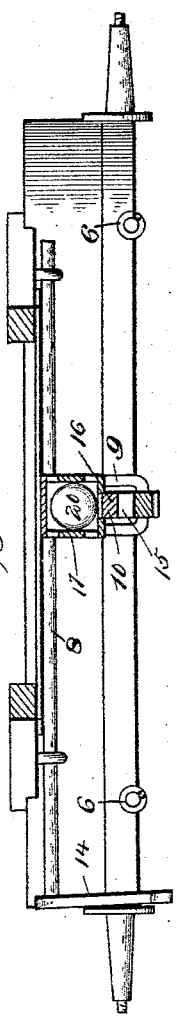
Witnesses
Inventor
Virgil A. Kemper,
By his Attorneys.

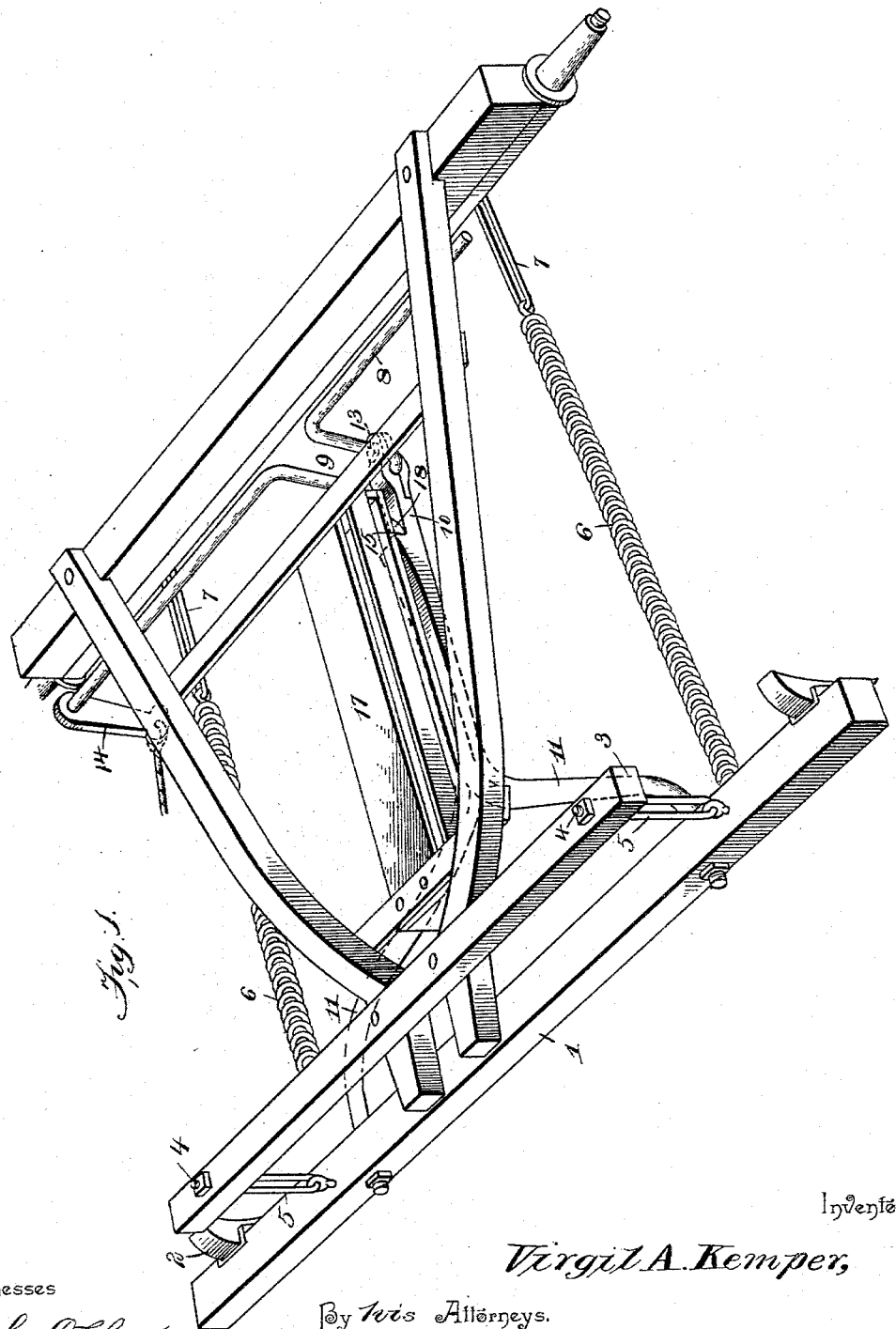

UNITED STATES PATENT OFFICE.

VIRGIL A. KEMPER, OF MARKSBURY, KENTUCKY.

AUTOMATIC VEHICLE-BRAKE.

SPECIFICATION forming part of Letters Patent No. 533,649, dated February 5, 1895.

Application filed May 5, 1894. Serial No. 510,195. (No model.)

*To all whom it may concern:*

Be it known that I, VIRGIL A. KEMPER, a citizen of the United States, residing at Marksbury, in the county of Garrard and State of Kentucky, have invented a new and useful Automatic Vehicle-Brake, of which the following is a specification.

The invention relates to improvements in automatic vehicle brakes.

The object of the present invention is to provide a simple and inexpensive vehicle brake, capable of being automatically applied in descending a hill, and adapted to be readily thrown off the wheels when desired.

The invention consists in the construction and novel combination and arrangement of parts hereinafter fully described, illustrated in the accompanying drawings, and pointed out in the claims hereto appended.

In the drawings: Figure 1 is a perspective view of a portion of a running gear provided with an automatic brake constructed in accordance with this invention. Fig. 2 is a reverse plan view. Fig. 3 is a longitudinal sectional view, showing the brake off. Fig. 4 is a transverse sectional view on line x—x of Fig. 2.

Like numerals of reference indicate corresponding parts in all the figures of the drawings.

1 designates a brake bar provided at its ends with brake shoes 2, and suspended adjustably from a transverse bar 3 by means of eye-bolts 4 and links 5. The eye-bolts are provided above and below the transverse bar 3 with nuts; and the links engage eyes of the brake bar and permit the latter to swing rearward to engage the hind wheels. When the brake is applied, by means hereinafter to be described, the brake shoes are held in contact with the wheels by spiral springs 6, arranged at opposite sides of the running gear and connected at their front ends to the brake bar, and at their rear ends by links 7 with the rear axle.

The brake shoes are thrown off the wheels by a rock-shaft 8, disposed transversely of the running gear, located in suitable bearings beneath the rear hounds, and provided intermediate of its ends with a loop 9, forming an arm and connected with the brake bar by a connecting bar 10. The connecting bar 10 has a forked front portion 11, the ends of which are threaded, passed through the brake bar and provided at the front and rear edges of the latter with nuts, whereby the brake bar is adjustable to take up the wear on the brake shoes. The rear end 12 of the connecting rod is provided with a bearing eye oppositely curved to receive the loop or bend 9 of the rock-shaft, and the upper and lower portions of the eye are extended beyond the engaged portion of the loop or bend, and are perforated to receive a connecting bolt 13 or other suitable fastening device, for retaining the loop or bend 9 in the bearing, the lower portion being removable. At one end the rock-shaft is provided with a downward extending arm 14, to which may be connected any suitable means for turning the rock-shaft to throw the brake shoes off the wheels.

Intermediate of its ends, and on its upper face the connecting bar 10 is provided with a shoulder 15, which is engaged by the rear end of a longitudinally disposed trip lever 16, which is fulcrumed in a box 17 at the bottom thereof, and is provided at its rear end with a tooth 18 to engage the shoulder of the connecting bar or rod. The box 17, which may be of any desired construction is provided in its bottom with a longitudinal opening to receive the trip lever, which is perforated intermediate of its ends to receive the fulcruming pivot or pin 19 arranged in suitable perforations of the box. In the box, which is disposed longitudinally of the running gear, and located beneath the hounds, is a ball or weight 20 for operating the trip lever, which has its front end 21 extended upward into the box through the opening of the bottom thereof. When the running gear inclines forward in descending a hill or declivity, the operating ball rolls forward, and depresses the front end of the trip lever raising the rear end against the action of a spring 22, and releasing the connecting bar, and permitting the spiral springs 6 to apply the brake. The box is secured by any suitable means beneath the hounds, and the spiral spring 22, which engages the upper edge of the rear end of the trip lever, is adapted to force the tooth 18 downward into engagement with the shoulder 15, when the connecting bar is moved forward by the rock-shaft to throw the brake shoes off the wheel, whereby the brake-bar will be held forward against the action of the spiral spring 6, until the parts are again tripped by the operating ball.

It will be seen that the brake is simple and inexpensive in construction, that it is automatic in operation, and that it is adapted to be readily applied to the ordinary construction of running gear.

Changes in the form, proportion, and the minor details of construction may be resorted to without departing from the principle or sacrificing any of the advantages of this invention.

What I claim is—

1. In a vehicle brake, the combination with a running-gear, of a brake-bar suspended therefrom and located in advance of the hind wheels, springs for forcing the brake-bar in engagement with the wheels, a trip lever for holding the brake-bar off the wheels and detachably connected with the said brake-bar, and a movable weight located in rear of the trip-lever and arranged to engage the same automatically when the running-gear is in an inclined position to release the brake-bar, substantially as described.

2. In a brake, the combination with a running gear, a brake bar provided with brake-shoes and arranged in advance of the hind wheels, springs for forcing the brake-shoes against the wheels, a trip lever arranged longitudinally of the running gear and having its rear end detachably connected with the brake-bar and having its front end extended upward, and an operating ball arranged to roll forward when the running gear is in an inclined position to engage the front end of the trip lever to detach the rear end of the same, substantially as and for the purpose described.

3. In a vehicle brake, the combination with a running gear, of a brake bar located in advance of the hind wheels, springs for forcing the brake-bar against the wheels, a transverse rock-shaft, a connecting bar extending from the rock-shaft to the brake-bar and provided intermediate of its ends with a shoulder, a box disposed longitudinally of the running gear and located above the connecting bar, a trip lever fulcrumed on the box at the bottom thereof and provided at its rear end with a tooth to engage the shoulder of the connecting bar, and an operating ball arranged within the box and adapted to engage the front end of the trip lever, substantially as described.

4. In a vehicle brake, the combination with a running gear, of a transverse bar secured to the same, a brake bar adjustably suspended from the transverse bar and provided with brake shoes, and located in advance of the hind wheels, springs connected with the rear axle and the brake-bar for forcing the brake-shoes in engagement with the hind wheels, a transverse rock-shaft journaled on the running gear and provided intermediate of its ends with a loop or bend and having at one end an arm, a connecting bar provided intermediate of its ends on its upper face with a shoulder and having its rear end attached to the loop or bend of the rock-shaft and provided with a forked front portion adjustably secured with the brake-bar, a box located above the connecting bar, a trip lever fulcrumed on the bottom of the box and provided at its rear end with a tooth for engaging the shoulder of the connecting bar, an operating ball located in the box and adapted to engage the front end of the trip lever, and a spring for forcing the rear end of the trip lever downward, substantially as described.

In testimony that I claim the foregoing as my own I have hereto affixed my signature in the presence of two witnesses.

VIRGIL A. KEMPER.

Witnesses:
W. H. KEMPER,
W. H. WHERRITT.